April 21, 1953     J. L. WINGET     2,636,139

ELECTROMAGNETIC COUPLING

Filed May 11, 1950

INVENTOR
JAMES L. WINGET
BY
Pennie, Edmonds, Morton and Barrows.
ATTORNEYS

Patented Apr. 21, 1953

2,636,139

UNITED STATES PATENT OFFICE 2,636,139

ELECTROMAGNETIC COUPLING

James L. Winget, White Plains, N. Y., assignor to Farrand Optical Co., Inc., a corporation of New York Application May 11, 1950, Serial No. 161,434

4 Claims. (Cl. 310—105)

This invention relates to a coupling or damper capable of transmitting a torque or force proportional to the difference in velocity between its driving and driven members, but which may be limited to any desired maximum value regardless of the velocity differential.

Various devices are known for providing a clutch which will transmit a torque or force proportional to the difference in angular or linear velocity between the driving and driven members thereof. Viscous dampers or clutches in which plates or sets of vanes move in a viscous fluid provide such a relationship. Similarly the eddy current type of damper or clutch, in which a body of electrically conducting material is moved relative to a magnetic field, provides a torque or force proportional to the difference in their angular or linear velocities.

In both the viscous fluid and eddy current type devices, fixing of the driven member transforms the clutch or coupling into a damper, damping the motion of the movable or "driving" member. Further, in both types the torque or force between the driving and driven members is, at least approximately, proportional to the difference in their angular or linear velocities, unless means are provided to alter the spatial relation of the two sets of vanes or of the magnet and conducting body. Such means are mechanically complicated. The present invention provides a coupling or damper in which the torque or force between the driving and driven members is proportional to the difference between their angular or linear velocities until a limiting velocity difference has been reached, after which it may be either constant or may increase with further increase in difference of velocities according to another law of proportionality. The result is useful where it is desired to transmit a limited torque or force, and where it is desired to permit the development of a limited damping torque or force.

The invention has application both to devices involving linear and to devices involving rotational motion. Where linear motion is involved the relations are between force and linear velocity. When rotational motion is involved the relations are between torque and angular velocity.

Because the applications of the invention to rotational motions are perhaps more numerous than the applications to linear motion, the invention will be described hereinafter primarily with reference to rotational motion. No limitation of the invention is thereby intended.

According to the invention, as applied to devices involving rotational motion, three members, viz. a magnet, an electrically conducting body, usually in the form of a sheet, and a magnetic body are mounted for rotation in a common axis. The magnetic body is composed of ferromagnetic material, but is not itself a magnet, i. e., it is not capable of producing unaided any substantial magnetic field external to itself. The magnetic and the conducting bodies are linked to separate mechanisms such as input and output shafts through which torque may be transmitted. Either the conducting sheet or the magnetic body may be the driving member and the other the driven member. The magnet is mounted for rotation in the common axis of rotation preferably with its magnetic axis or axes substantially perpendicular thereto. The three members are further arranged so that the conducting body rotates between the magnet and the magnetic body. The three members should in general be positioned together so that as large as possible a fraction of the field of the magnet passes through the sheet and penetrates the magnetic body. The magnet is unrestrained in rotation except by the influence of its magnetic field. The actions of this magnetic field upon the conducting sheet and upon the magnetic body are such as to oppose any alteration in the angular orientation of the magnet with respect to either of the other members. Relative rotation of the magnet and sheet develops eddy currents whose presence in the field of the magnet gives rise to a torque between the magnet and the sheet, requiring the expenditure of energy to accomplish such rotation. Rotation of the magnetic body relative to the magnet requires the expenditure of energy because of the magnetic hysteresis cycle through which the magnetic body is driven by variation in the magnetic field produced at each point in the body as the magnet moves relative thereto.

Since the magnet is otherwise free to rotate, the torque developed between the magnet and the member to which rotation is applied is developed also between the magnet and the other member, so that a torque is communicated from the input shaft to the output shaft.

The characteristic of the interaction between the magnet and the conducting sheet is a torque proportional to the difference between their angular velocities. Between the magnet and the magnetic member a force of hysteresis analogous to a force of friction opposes any relative motion with a torque which is independent of the difference in angular velocities, provided the magnetic member is non-conducting as well as non-magnetic. If it is conducting, the initial torque which opposes any relative rotation is compounded with a torque proportional to the velocity difference between the magnet and the magnetic member. By appropriate choice of the strength of the magnet, the conductivity of the sheet, and the hysteresis value and conductivity of the magnetic member, couplings or dampers may be produced having a wide variety of relations between torque and difference in the velocity of the input and output shafts.

My invention will now be further described in connection with the accompanying drawings in which Fig. 1 is an axial section of a coupling or damper according to my invention for the transmission of torque or the damping of rotational motion.

Figure 1:
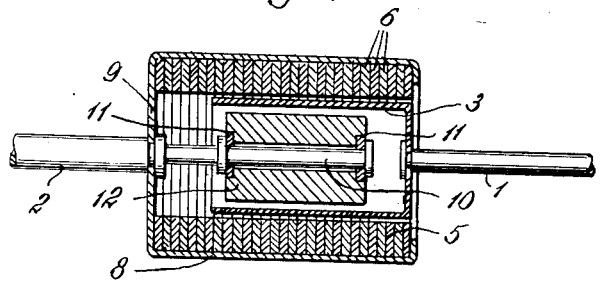

In the device of Fig. 1 shafts 1 and 2 are mounted for coaxial rotation in bearings not shown. The shaft 1 has affixed thereto as conducting body a sheet 3 of conducting material such as copper or aluminum. The sheet is preferably made of a non-magnetic material, so that the field of the magnet 12, presently to be described, will pass unimpeded therethrough to the magnetic body 5. The sheet 3 conforms at least in part to a cylinder coaxial with the shaft 1. In the form of construction illustrated in Fig. 1, the sheet possesses the shape of a cylindrical cup fastened to the shaft 1 at the center of its base.

The shaft 2 has affixed thereto in coaxial relation a magnetic body or core 5 composed of ferromagnetic material. The core 5 is preferably of generally annular or cylindrical shape and is conveniently formed of a plurality of rings or disks 6 punched from sheet iron or steel. If a device capable of transmitting a large torque is desired, the material from which the disks 6 are formed should have a high hysteresis constant in order that the device may be of small size and employ a magnet of moderate strength. The rings may be lacquered or otherwise insulated from each other so that the core 5 will be electrically non-conducting in directions parallel to its axis. The rings are held together in a tubular stack by any convenient means such as a retaining cylinder 8. The cylinder 8 may be made of either a metal or a non-metal. A non-metal should be used if it is desired to eliminate entirely eddy currents in the torque developed between the magnet and the core. A plate or spider 9 forming the base of the retaining cylinder 8 permits rigid attachment of the core to the shaft 2. The core may alternatively be made of powdered or comminuted iron, or of ferrites, according to methods known in the art for producing bodies having permeabilities substantially in excess of unity, substantial hysteresis, but low conductivity.

An inner shaft 10 coaxial with the shafts 1 and 2 supports a magnet 12 for rotation thereon in bushings 11. The magnet 12 may be of cylindrical shape and may include one or more pairs of poles, one pair being usually sufficient. For most purposes a permanent magnet is most suitable and convenient, but an electromagnet or magnets may be employed, if it is desired to be able to alter the strength thereof. In such case slip rings for the energization of the electromagnet must be provided. The magnetic axis of the poles should be preferably substantially perpendicualr to the shaft 10. The external flux of the magnet will then pass through the non-magnetic cylinder or cup 3 and into the core 5 where it will move circumferentially of the core to a region opposite a pole of the opposite sign.

Evidently, apart from the effect of the field of the magnet 12, each of the three members, 3, 5 and 12 is free to rotate independently of the others. If the conducting sheet is rotated however, voltages induced in the cylindrical portion thereof by its motion in the field of the magnet 12 will generate eddy currents whose flow will impose an accelerating torque on the magnet proportional to the difference between the velocities of the sheet and the magnet. The magnet is restrained from following the cup by the torque of hysteresis resisting any rotation of the magnet relative to the core. This hysteresis torque possesses a maximum value attained when the magnet is set into rotation with respect to the core, which event will occur when the eddy current torque between the sheet 3 and the magnet reaches the value of the hysteresis torque.

Figure 3:
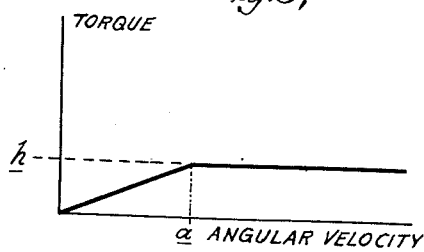
Figs. 3 and 4 are graphs illustrating the performance of the couplings of Figs. 1 and 2.

The resulting torque between the shafts 1 and 2 varies as a function of the difference between their velocities in the manner illustrated in Fig. 3 where angular velocity difference of the conducting and magnetic members is plotted horizontally and torque vertically. Until the velocity difference $a$ is reached, the torque will increase in proportion to the velocity difference, with the magnet remaining stationary relative to the core. When the velocity difference reaches the value $a$, the eddy current torque becomes equal to the maximum torque of hysteresis. At higher velocity differences the magnet will rotate with respect to the core, following the conducting sheet.

For angular velocities of the conducting sheet with respect to the core higher than $a$ in Fig. 3, the magnet will rotate at a speed below that of the sheet by the amount required to generate an eddy current torque equal to the maximum torque of hysteresis indicated by the ordinate $h$ in Fig. 3. Accordingly, the maximum torque that can be transmitted from the shaft 1 to the shaft 2 or vice versa is the torque of hysteresis $h$.

Thus the device of Fig. 1 provides a torque proportional to the velocity difference between the input and output shafts until a limiting torque is reached. The value of this limiting torque is determined by the hysteresis constant of the material of which the core is composed, by its size and shape and by the strength of the magnet. The minimum velocity difference at which this maximum torque will be developed and the slope of the torque-speed curve for velocity differentials below this critical velocity are determined by the size and conductivity of the sheet 3, by the strength of the magnet 12 and by its spatial relation to the sheet.

If core materials having the desired hysteresis constant in joules per cubic inch per magnetic cycle (or equivalent units) are not available, an effective hysteresis constant of the desired value may be produced by combining in suitable proportions laminations of two materials, one having a hysteresis constant above and the other a hysteresis constant below that desired.

Figure 4:
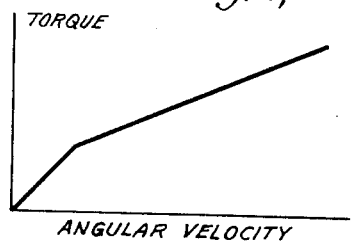

If it is desired to permit the transmitted torque to increase above the hysteresis torque characteristic of the magnet and magnetic body, this may be achieved by permitting the development of eddy currents in the magnetic body. The magnetic body or core in such case may be constructed of a single cylinder of magnetic material having substantial conductivity in directions parallel to the axis of rotations. The same effect may be produced with a laminated core by affixing a cylinder of conducting material to the walls of the cylindrical cavity in the core so that the flux of the magnet must traverse this conducting material, as well as that of the conducting sheet, before reaching the magnetic material of the core. The torque-speed characteristic of such a device is illustrated in Fig. 4. The torque here rises from zero for zero velocity differential according to a law of proportionality which is dependent, as in the embodiment in which eddy currents in the magnetic member are suppressed, only on the magnet and the sheet. However once the magnet is set into rotation with respect to the core, an additional eddy current torque is developed between the magnet and the core. This eddy current magnet-magnetic body torque increases with increasing velocity differential, as the magnet, drawn by the conducting sheet, rotates ever faster with respect to the core. As a result, the torque between the conducting and magnetic bodies, as plotted in Fig. 4, instead of remaining constant at the maximum hysteresis torque value, increases according to another law of proportionality dependent, among other things, on the conductivity of the magnetic body.

It is of course immaterial whether the magnet is supported from the conducting sheet or from the magnetic body or from a separate structure.

Likewise the positions of the magnet 12 and magnetic body 5 may be interchanged, with the magnetic body innermost and the conducting body and magnet successively radially outside thereof. The magnet may then be of annular shape, possessing poles of opposite sign between which the external field of the magnet passes across the space within the annulus. The conducting body may then be of a shape similar to that of the cup 3 of Fig. 1, and the magnetic body or core may be of cylindrical shape, rotating within the conducting body.

Even with the magnet outermost, however, it is not necessary that the magnet be annular in shape. If the magnetic body is innermost and the magnet outermost, a horseshoe magnet will give the necessary field and can be supported for rotation from the conducting member or otherwise, with the axis of its poles perpendicular to and (approximately) intersecting the axis of rotation. The magnet should of course however preferably be balanced for free rotation in the common axis.

Figure 2:
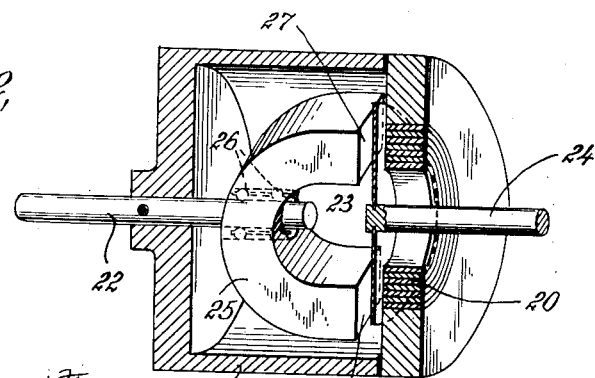
Fig. 2 is an axial section of a modified form of coupling for the transmission of torque or the damping of rotational motion.

Fig. 2 illustrates an embodiment of the invention as applied to rotational motion in which the three members are axially rather than radially arranged. A magnetic body or core 20 is affixed to one shaft 22 and a body 23 of non-magnetic electrically conducting material is affixed to another shaft 24. The magnet 25 is mounted on bearings 26 to rotate independently of the other members, on the side of the conducting body away from the magnetic body. As in the embodiment of Fig. 1 therefore the conducting body is between the magnet and the magnetic body. As shown in Fig. 2 the conducting body is in sheet form, having the shape of a flat disk mounted for rotation about its own axis. The magnetic body is in a form of a ring or disk with its center removed, and is supported from a shaft 22 by a supporting structure 21 which may have the general form of a cup or spider. If eddy current torque between the magnetic body and the magnet is to be avoided, the support 21 should be made of non-magnetic material. To the same end the magnetic body is made up of a series of concentric, cylindrical laminations insulated from each other, or it may be made up of a single strip of magnetic material wound on itself in a coil. The annular shape of the magnetic body as opposed to a solid flat disk requires the lines of force to follow circumferential paths parallel to the plane of the laminations, thus effectively preventing the development of eddy currents.

The magnet 25 has one or more pairs of poles 27 and is mounted so that its poles face and are closely spaced from the conducting body 23 which in turn is closely spaced from the magnetic body 20.

The operation of the embodiment of Fig. 2 is similar to that of the embodiment of Fig. 1 and is illustrated by a curve of the shape shown in Fig. 3. Likewise if the lamination is omitted in the construction of the magnetic body, the device will be characterized by a torque-angular velocity curve of the shape shown in Fig. 4.

As in the embodiment of Fig. 1 it is of course immaterial whether the magnet is supported from the shaft which carries the magnetic body or from that which carries the conducting body. It may equally well be supported from a separate structure.

Figure 5:
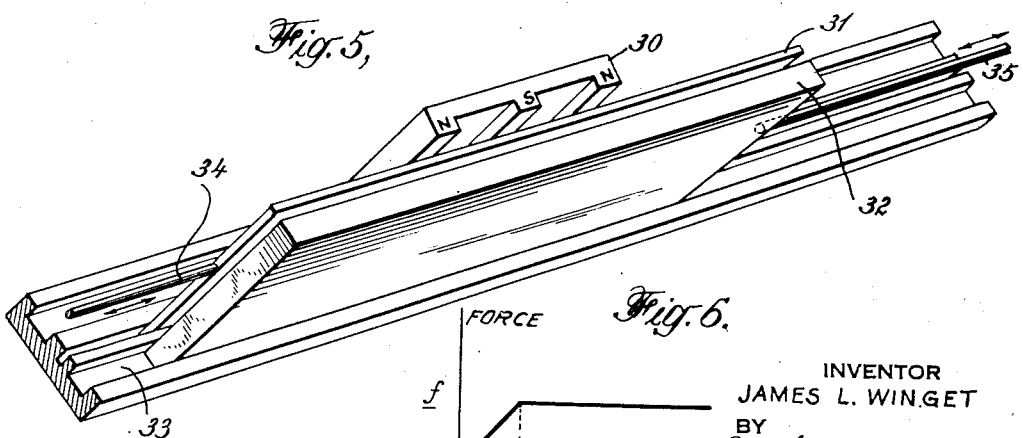
Fig. 5 is a diagrammatic representation of an embodiment of my invention as applied to linear rather than rotational motion.

Fig. 5 illustrates the application of the invention to the case of linear motion. A magnet 30, a non-magnetic electrically conducting body 31 of sheet form and a magnetic body or core 32 of ferromagnetic material are supported as by ways 33 for parallel motion. The magnet has a plurality of poles facing the conducting body, which lies between the magnet and the magnetic body. The magnet is oriented with the magnetic axis joining its poles parallel to the direction of motion of the magnet along the ways 33. The sheet 31 and core 32 are preferably substantially longer than the magnet in the direction of their common motion so that in spite of relative motions of the three members, portions of the core and sheet will remain immediately opposite the poles of the magnet 30.

Shafts 34 and 35 or equivalent devices connect with the sheet and core for the imposition and transmission of forces. For most applications the ways 33 should offer as little frictional resistance to motion of the members 30, 31, and 32 as possible. While it is not necessary that the paths of the three members as defined by the ways be exactly parallel, it is essential that in the relative motion of the magnet and magnetic body there be a component parallel to the magnetic axis of the magnet, and the magnetic body must move within the field of the magnet, preferably as close thereto as possible. The magnetic body may be advantageously laminated in planes parallel to the direction of its motion as shown in the figure, if eddy current forces between the magnet and the magnetic body are to be suppressed.

Motion imparted to the body 32 will give rise to a force of hysteresis tending to accelerate the magnet 30 into motion following the magnetic body 32. This force of hysteresis has a maximum value analogous to the maximum torque of hysteresis in the rotational case. Motion of the magnet 30 will give rise to an eddy current force between the magnet and the conducting body or sheet 31 which will tend to accelerate the sheet into motion following the magnet, and whose reaction will oppose the motion of the magnet. This eddy current force is proportional to the difference in linear velocity between the sheet and the magnet. It may or may not be sufficient to set the sheet in motion, depending upon the connected load.

Conversely, the power may be applied to the sheet, and the load to the magnetic body or core 32. In either case the force tending to accelerate the load-connected member into motion will be proportional to the difference in velocity between the conducting body 31 and the magnetic body 32 until a limiting velocity difference is reached at which the eddy current force equals the maximum force of hysteresis. For a higher velocity difference the magnet will slip with respect to the magnetic body.

Figure 6:
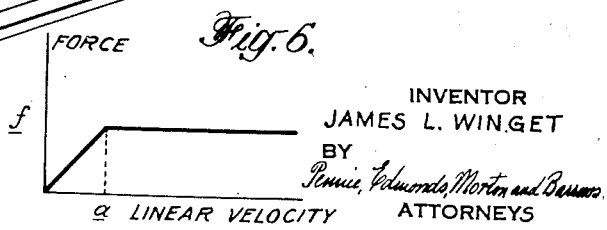
Fig. 6 is a graph illustrating the performance of the device of Fig. 5.

The force-velocity relation of the device of Fig. 5 is shown in Fig. 6. It will be noted that Fig. 6 is similar to Fig. 3 except that the coordinates force and linear velocity difference have been substituted for the coordinates torque and angular velocity of Fig. 3, respectively. If the magnetic core body 32 possesses electrical conductivity in both directions in planes perpendicular to its direction of relative motion with respect to the magnet, the curve of Fig. 6 will continue to slope up after the break point $a$ as in the case of the curve of Fig. 4. The preferred plane for the laminations is that which is as nearly as possible at all times parallel to the path of the lines of force.

The devices employed to transmit or apply torques or forces to the magnetic and conducting bodies may be widely different from the shafts which have been shown in the embodiments described. One or the other of the conducting or magnetic bodies may be affixed to a structure to which it is desired to apply a torque or force through the device of the invention. When the device of the invention is employed as a damper rather than as a coupling for the transmission of force or torque, one of the two bodies will be fixed to the structure with respect to which the motion of the other body is to be damped. In the appended claims the term "coupling" is to be understood as referring to a damper as well as to a device for connecting together two shafts or equivalent mechanisms both capable of motion.

I claim:

1. A coupling comprising a magnetic body formed of material having substantial hysteresis and an electrically conducting body, said bodies serving interchangeably as input and output members of said coupling, one of said bodies being arranged for motion with respect to the other, means to transmit force to the movable body, and a magnet arranged for motion substantially free of mechanical restraint parallel to the motion of the movable body on the side of the conducting body away from the magnetic body, the magnet having its poles facing the conducting body.

2. A coupling comprising a body of ferromagnetic material of substantially flat disk shape, an electrically conducting body of substantially flat disk shape, means to support the said bodies for rotations in a common axis, a magnet having one or more pairs of poles, said magnet being mounted for free rotation in the said axis on the side of the conducting body away from the magnetic body with its poles facing the conducting body, and separate means to apply torques to the said bodies.

3. A coupling comprising an annular core of magnetic material, a sheet of electrically conducting material conforming at least in part substantially to a cylinder, a magnet, means to support the magnet, sheet and core for independent rotations in a common axis of rotation without mechanical restraint on the rotation of the magnet, and separate means to apply torques to the core and to the conducting sheet.

4. A coupling comprising coaxial input and output shafts, an annular core of magnetic material affixed to one of the shafts, a cylinder of non-magnetic electrically conductive material affixed to the other of the shafts for rotation therewith within the core, and a magnet supported from one of the shafts for free rotation with respect thereto within the cylinder about the axis of rotation of the shafts.

JAMES L. WINGET.

References Cited in the file of this patent

UNITED STATES PATENTS

| Number | Name | Date |
|---|---|---|
| 717,497 | Cuenod | Dec. 30, 1902 |
| 1,526,773 | Clough | Feb. 17, 1925 |
| 1,552,155 | Hawley | Sept. 1, 1925 |
| 1,897,184 | Zopp | Feb. 14, 1933 |
| 2,131,035 | Beechlyn | Sept. 27, 1938 |
| 2,159,768 | Macmillan | May 23, 1939 |
| 2,193,214 | Winther | Mar. 12, 1940 |
| 2,245,784 | James | Jun. 17, 1941 |
| 2,411,122 | Winther | Nov. 12, 1946 |
| 2,490,789 | Ellis | Dec. 13, 1949 |
| 2,492,678 | Amtsberg | Dec. 27, 1949 |
| 2,542,659 | Gillett | Feb. 20, 1951 |